July 28, 1925.
C. L. MYERS
JACK
Filed March 30, 1923  2 Sheets-Sheet 1
1,547,946
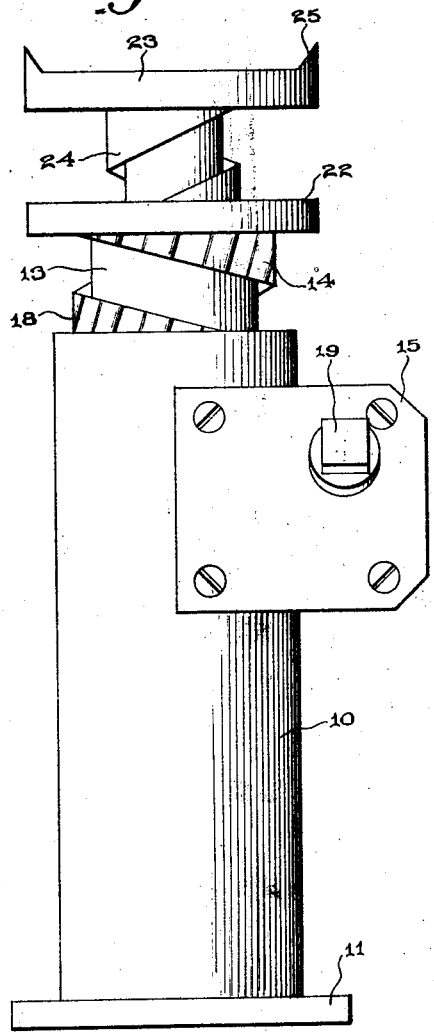
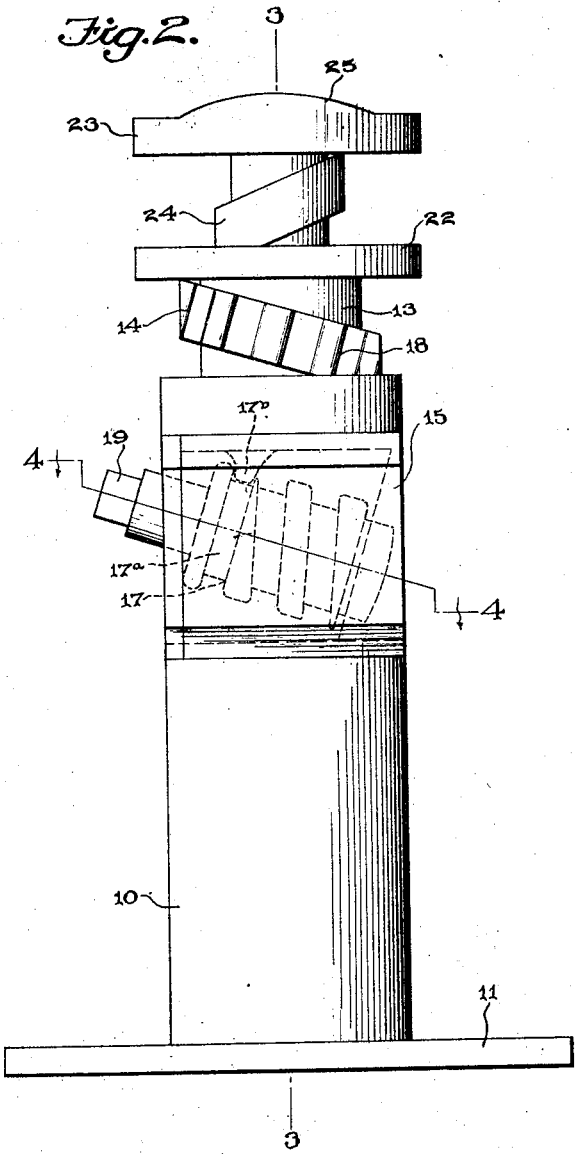
Corson L. Myers
INVENTOR July 28, 1925.
C. L. MYERS
JACK
Filed March 30, 1923    2 Sheets-Sheet 2
1,547,946
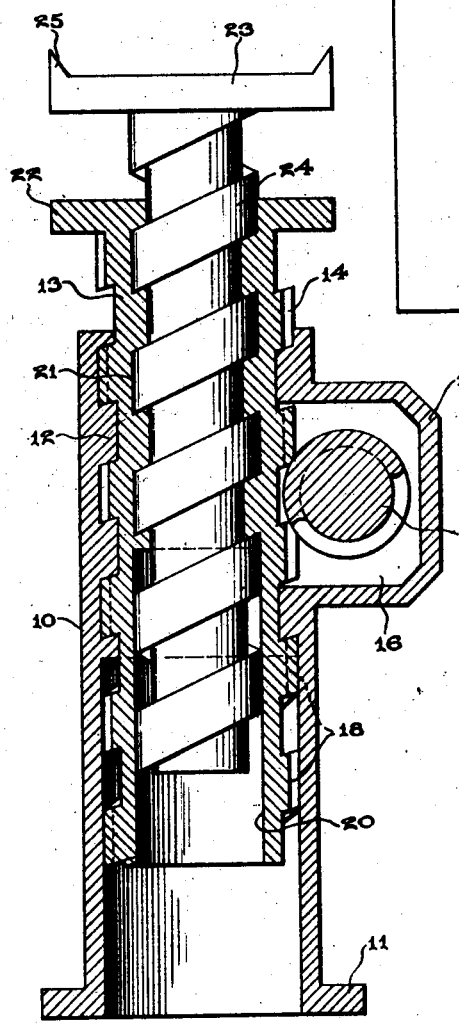
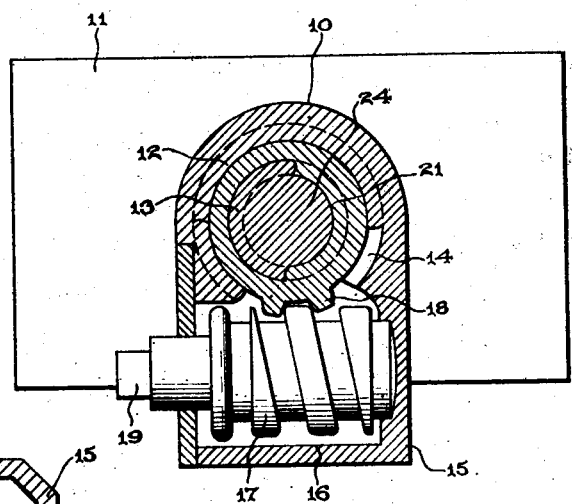
Corson L. Myers
INVENTOR
ATTORNEY
WITNESS:

Patented July 28, 1925.

1,547,946

UNITED STATES PATENT OFFICE.

CORSON L. MYERS, OF FLEMINGTON, PENNSYLVANIA.

JACK.

Application filed March 30, 1923. Serial No. 628,831.

*To all whom it may concern:*

Be it known that I, CORSON L. MYERS, a citizen of the United States, residing at Flemington, in the county of Clinton and State of Pennsylvania, have invented new and useful Improvements in Jacks, of which the following is a specification.

This invention relates to improvements in lifting jacks and has for an object the provision of a jack which in addition to being strong and compact in construction, includes rapidity of movement, as well as increased height of lift.

Another object of the invention is the provision of a jack of the above character which is simple in construction and operation and which may be manufactured and sold at a moderate cost.

With the above and other objects in view, the invention further includes the following novel features and details of construction, to be hereinafter more fully described, illustrated in the accompanying drawings and pointed out in the appended claims.

In the drawings:—

Figure 1 is an elevation of a jack constructed in accordance with the invention.

Figure 2 is an elevation at right angles to Figure 1.

Figure 3 is a section on the line 3—3 of Figure 2.

Figure 4 is a similar view on the line 4—4 of Figure 2.

Referring in detail to the drawings, wherein like characters of reference denote corresponding parts, the reference character 10 indicates a housing which is mounted upon a base 11 and which is internally threaded for a portion of its length as shown at 12.

Mounted within this housing is a main shank 13 which is externally threaded as shown at 14 so as to engage the threads 12 of the housing, whereby, when the shank 13 is rotated, vertical movement will be imparted thereto.

To accomplish this there is provided a housing extension 15 which projects laterally from one face of the housing and which communicates with the interior of said housing through an opening 16. Mounted within bearings provided in the extension 15 is a driving screw 17, the threads of which engage spaced transversely disposed teeth 18 provided in the threads of the shank 13. The screw 17 extends beyond the housing and is provided with a rectangular portion 19 for engagement with a handle or wrench, by means of which the screw may be rotated.

The main shank 13 is provided with a bore 20 which is internally threaded for a portion of its length as shown at 21, while its upper end is provided with a platform 22. This platform may rest upon the upper end of the housing 10, or may be engaged by a platform 23 which is carried by an extension shank 24. This last mentioned shank is exteriorly threaded for engagement with the internal threads 21 of the shank 13. The platform 23 of the shank 24 is provided with oppositely located flanges 25 which are adapted for engagement with the load to be lifted to prevent rotation of the extension 24.

The screw 17 is provided with an annular groove $17^a$ and the walls of this groove are engaged by a lug $17^b$ which is carried by the housing extension 15. This prevents longitudinal movement of the screw 17 when the latter is operated and acts to hold the screw in proper operative engagement with the teeth 14, so that binding is prevented.

By the application of suitable power to the screw 17, the latter may be rotated so as to rotate the shank 13, the said shank moving vertically through its threaded engagement with the housing 10. As the shank extension 24 is held against rotation, rotation of the main shank 13 will also impart vertical movement to the said shank 24 so that the shanks will move relatively. Through the application of worm gearing between the screw 17 and the main shank 13, a considerable amount of lifting power is provided, while the relative movement of the shanks 13 and the extension 24 provide for rapidity of lifting and for increased height of lift.

The invention is susceptible of various changes in its form, proportions and minor details of construction and the right is herein reserved to make such changes as properly fall within the scope of the appended claim.

Having described the invention what is claimed is:—

A jack of the character described comprising a housing internally threaded an appreciable portion of its length, a hollow main shank threaded both internally and externally and threadedly engaging the housing therein, a plurality of transversely disposed teeth provided in the externally threaded portion of the main shank, a housing extension projecting laterally from one face of the housing and communicating with the interior of same, a driving screw mounted within the extension which engages the transversely disposed teeth in the external threads of the main shank, a platform provided upon the upper end of the main shank, an exteriorly threaded extension shank threadedly engaging the interiorly threaded portion of the main shank, the outer end of the driving screw provided with attaching means whereby rotation of this end may impart vertical movement to the main shank, and a lug engaging an annular groove in the driving screw to prevent longitudinal movement and cause more firm engagement of same.

In testimony whereof I affix my signature.

CORSON L. MYERS.